Figure 1:
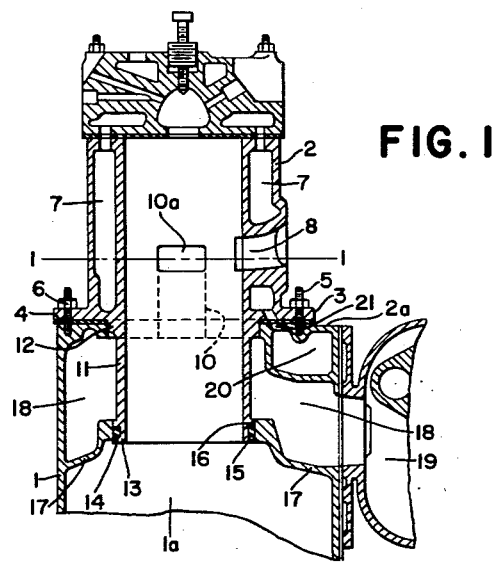

June 27, 1961   R. KESSLER ET AL   2,989,953
INTERNAL-COMBUSTION ENGINE
Filed Sept. 24, 1959

INVENTORS
RICHARD KESSLER
HANS WILLIG

United States Patent Office
2,989,953
Patented June 27, 1961

1

2,989,953
INTERNAL-COMBUSTION ENGINE
Richard Kessler and Hans Willig, Mannheim, Germany, assignors to Deere and Company, Moline, Ill., a corporation of Delaware
Filed Sept. 24, 1959, Ser. No. 841,986
1 Claim. (Cl. 123—41.31)

The invention concerns a blower-scavenged two-cycle internal-combustion engine with reverse scavenging and with at least one water- or air-cooled cylinder set on the crankcase and having its lower end projecting into the crankcase. The problem solved by the invention involves the simplification of the cylinder cooling, resulting in uniform heating of the cylinder.

A blower-scavenged two-cycle internal-combustion engine with reverse scavenging is known in which the cooling medium first strikes the cylinder in the area of the exhaust port, and the stream of scavenging air coming into the cylinder is led to the area of the cylinder wall opposite the exhaust port. In the lower area of the cylinder which extends into the crankcase, the cylinder is however, in such prior art, enclosed by a cooling water jacket, which represents an additional expenditure, increasing the cost of the engine. Also known are engines of the type having several cylinders arranged in line and having lower ends projecting into the crankcase and cooled by scavenging air while the upper parts of the cylinders are surrounded by a cooling water jacket.

The problem stated is solved according to the invention essentially in that the cooling medium strikes the cylinder first in the area of the exhaust port, and the stream of scavenging air coming into the cylinder is led to the area of the cylinder wall opposite the exhaust port, separated from the direct stream of the cooling medium by the air inlet channels, and furthermore in that the cylinder is cooled in its lower crankcase area by scavenging air. In this manner a simplification of the cylinder cooling results, for water cooling as well as for air cooling, since only the part of the cylinder located above the crankcase has to be provided with cooling devices, for example cooling water channels or cooling ribs. Thus the cylinder achieves a more uniform temperature at all points, so that the sliding properties of the piston-contacted surface of the cylinder are considerably improved. This in turn means that the piston can be provided with a considerably simpler polished surface for the purpose for adapting itself to the interior surface of the cylinder wall, whereby the production costs of the engine can be lowered and its operation improved.

According to the invention, in the case of air cooling, the cooling ribs of the area of the cylinder wall against which the scavenging air is led are those struck by cooling air which was already heated on the exhaust side.

Details and further objects of the invention will become apparent from the following description and from the drawing, which illustrates an example of execution of the invention.

Figure 2:
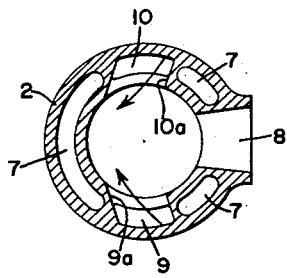

FIG. 1 shows a partial cross section through a water-cooled two-cycle diesel engine, while FIG. 2 represents a section along line I—I of FIG. 1.

In the drawing, 1 designates the crankcase of a two-cycle diesel engine, which for the sake of simplicity is only partly represented but which, as is usual, has the customary outer walls, including a top wall 2a onto which is set a cylinder 2. For this purpose the cylinder 2 has a flange 3 by means of which it is fastened to the crankcase via a packing ring 4, studs 5 and nuts 6. Above the flange 3 the cylinder 2 has jacket means including cooling water channels 7, an exhaust port 8 and two air inlet channels or duct means 9 and 10 (FIG. 2). Below the flange 3 on the other hand the cylinder is fashioned as a simple sleeve 11, which has a collar 12 that centers the cylinder 2 in the crankcase 1. At the lower end of the sleeve-like part 11 is provided a second collar 13 having an annular groove 14 to receive a packing ring 15, which lies against the surface 16 of a partition wall 17 cast into the crankcase, providing a seal. The partition 17 in turn serves as floor of a scavenging air receiver 18 or chamber, the rest of which is formed by the lower part 11 of the cylinder 2 and by the upper walls of the crankcase 1, and to this is connected the scavenging air blower 19. The air chamber is of course separated from the crank chamber 1a of the crankcase.

As can be seen from FIG. 2, the air inlet channels 9 and 10 terminate respectively as scavenging air ports 9a and 10a which are so formed that the stream of air leaving them is led to the interior of the inner wall of the cylinder lying opposite the exhaust port 8 (arrows, FIG. 2). In this area of the cylinder the cooling water stream is so deflected by the air inlet channels 9 and 10, which proceed upwardly from the air chamber 18 and lead to the cylinder as aforesaid, that the cooling effect of the water is less in that area than at the remaining parts of the cylinder; however, this is compensated for by the comparatively cool scavenging air that streams in. The cooling water enters by means of a cooling water supply channel 20 arranged in the crankcase 1a and running in the long direction of the same, and from there through openings 21, provided below the exhaust port 8, and into the cylinder jacket or channels, so that the hottest area of the cylinder is struck first by the cooling water. The cooling water can ultimately, however, also flow directly towards the cylinder at the aforesaid area opposite the exhaust port 8 by flowing over the scavenging air supply channels. On the exhaust side of the engine is the scavenging air blower 19, which serves as means to force the scavenging air into the air chamber 18, where it cools the lower end 11 of the cylinder 2 and subsequently enters the cylinder 2 through the air supply channels 9 and 10.

The invention is not limited to the example of execution represented and described, but naturally also comprises further possibilities of execution.

What is claimed is:

An internal-combustion engine, comprising: a crankcase; a cylinder on the crankcase; said crankcase having walls including a top wall and a partition wall spaced below the top wall and said top and partition walls having cylinder-receiving openings therein; said cylinder having a lower part tightly received in said openings and an upper part extending beyond the top wall; means providing a liquid-coolant jacket surrounding the upper part of the cylinder; said lower part of the cylinder and that portion of the crankcase between and including the top and partition walls providing a scavenging air chamber separated from the remainder of the crankcase by said partition, said crankcase having a scavenging air inlet leading to said chamber and said crankcase further including therein a liquid-coolant passage separate from the air chamber and inlet but adjacent to said inlet; said cylinder upper part having a scavenging air port and an exhaust port therein and including wall means providing an exhaust duct leading outwardly from the exhaust port and through and exteriorly of the jacket in an area closely above the coolant passage in the crankcase; means providing a scavenging air duct leading upwardly within the jacket and connecting the chamber to the cylinder scavenging air port, said air duct means affording a deflector within said jacket between the exhaust port and the area of the cylinder diametrically opposite to said exhaust port; means for supplying scavenging air to the chamber via said inlet; means providing a coolant duct connecting the crankcase coolant passage to the cylinder jacket in the immediate vicinity of the exhaust port; and means in the scavenging air port for causing scavenging air entering the cylinder through said scavenging air port to be directed to the interior of the cylinder in an area substantially diametrically opposite to the exhaust port.

References Cited in the file of this patent

UNITED STATES PATENTS

| | | |
|---|---|---|
| 2,023,403 | Butler | Dec. 10, 1935 |
| 2,136,960 | Wurtele | Nov. 15, 1938 |
| 2,681,050 | Schnurle et al. | June 15, 1954 |

FOREIGN PATENTS

| | | |
|---|---|---|
| 653,500 | Germany | Nov. 25, 1937 |
| 720,908 | Germany | May 19, 1942 |
| 939,543 | Germany | Feb. 23, 1956 |